Aug. 19, 1969   B. B. JACOBSON   3,461,988
ENGINE GOVERNOR RESPONSIVE TO VEHICLE SPEED
Filed June 15, 1967
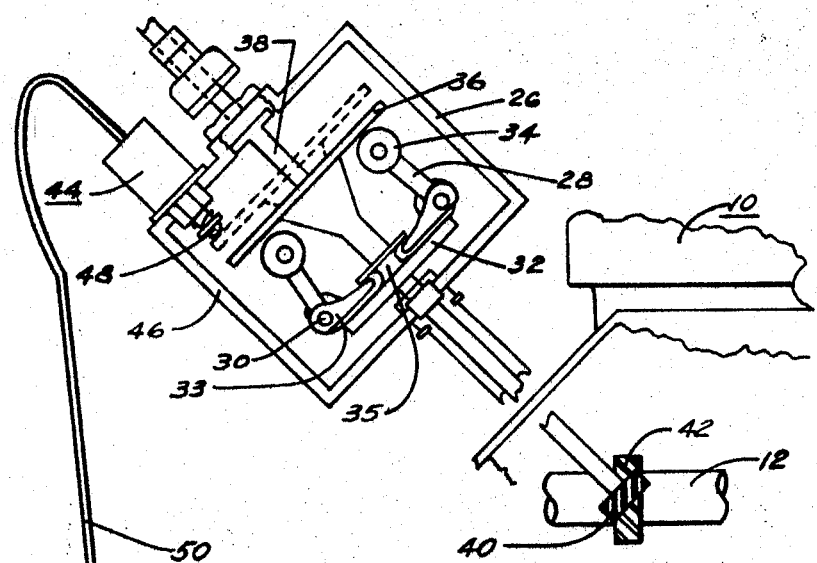
FIGURE 1
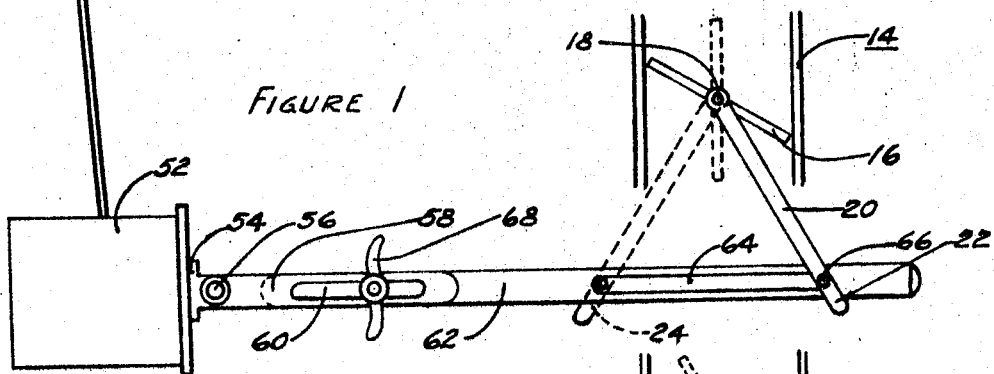
FIGURE 2
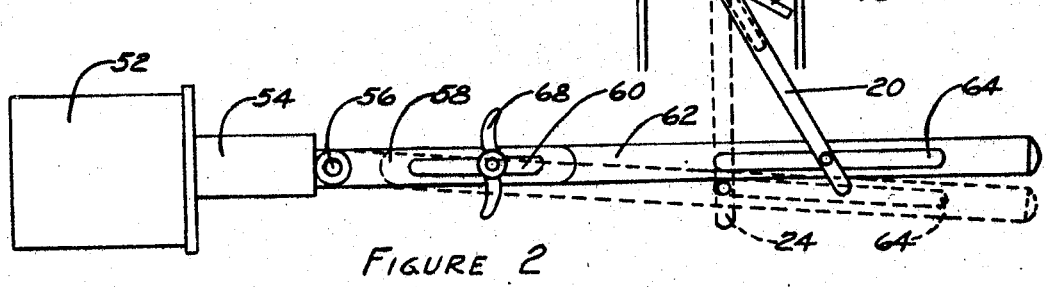
INVENTOR
BENJAMIN B. JACOBSON
BY
ALFRED E. WILSON
ATTORNEY

United States Patent Office 3,461,988
Patented Aug. 19, 1969

3,461,988
ENGINE GOVERNOR RESPONSIVE TO
VEHICLE SPEED
Benjamin B. Jacobson, 108 Twin Shores Blvd.,
Sarasota, Fla. 33577
Filed June 15, 1967, Ser. No. 646,259
Int. Cl. B60k 27/06, 31/00
U.S. Cl. 180—105      4 Claims

ABSTRACT OF THE DISCLOSURE

An engine speed control governor for a vehicle having a device for metering the flow of combustible charge to the engine and wherein a speed control element, responsive to the speed of the vehicle, reduces the flow of fuel to the engine when the speed of the vehicle exceeds a selected speed to prevent the engine from operating at excessive speeds. The control, being responsive to vehicle speed, permits the engine to operate at sufficiently high speeds to develop maximum rated engine horsepower when required by the load imposed on the engine.

---

This invention relates to governors for internal combustion engines, and more particularly to an improved vehicle speed responsive governor for limiting the speed at which an engine is permitted to operated by reducing the quantity of the combustible mixture delivered to the engine. With my improved governer the engine is prevented from overspeeding, but it is permitted to run at sufficiently high speeds to enable it to develop the maximum engine rated horsepower when high loads are imposed on the engine.

There are many governors available for engines, but none have proven to be completely satisfactory because they limit the maximum speed at which the engine can be operated regardless of the speed at which the vehicle is travelling. Engines are designed to develop their maximum horsepower at relatively high speeds, and the manufacturers recommend that the engine be operated at speeds not materially in excess of these relative high speeds. As an example, one engine is rated to develop its peak torque of 400 horsepower at 3,800 r.p.m. In the operation of this engine many of the governors being used commercially will limit the speed of the engine to approximately 3,300 r.p.m., the engine speed required to drive the vehicle at a speed of approximately 55 m.p.h. on a level road. At that speed the engine is only capable of developing approximately 240 horsepower, leaving unavailable the peak approximately 160 horsepower of which the engine is capable of developing. The engine is thus incapable of carrying loads which it is designed to carry and which it should be able to carry with ease.

An object of my invention is to provide an improved governor for preventing an engine from overspeeding and wherein a vehicle speed responsive governor control mechanism is employed for limiting the maximum speed at which the engine can be operated by varying the rate of the flow of combustible mixture to the engine in accordance with vehicle speed to permit the engine to run at a sufficiently high speed to develop its maximum rated horsepower when required to carry the load to which the engine is subjected.

A further object of my invention resides in the provision of a variable throttle stop mechanism responsive to variations in vehicle speed for restricting the maximum speed at which an engine can be operated but which permits the engine to operate at sufficiently high speeds to develop the maximum horsepower for which the engine is designed.

Other objects and advantages of my invention will appear in the following description considered with the accompanying drawings submitted for purposes of illustration. In the drawings wherein similar reference characters refer to similar parts throughout the several views:

FIGURE 1 is a fragmentary view, partly in section illustrating my improved governor as applied to a vehicle engine and transmission.

FIGURE 2 is a schematic view illustrating the throttle control in the governed position for restricting the quantity of combustible mixture supplied to the engine.

Referring now more particularly to FIGURE 1 my invention is illustrated as applied to a vehicle engine 10 operably connected through suitable torque transmitting mechanism to drive a transmission shaft 12. Fuel to drive the engine 10 is supplied by a suitable fuel feeding device shown diagrammatically at 14 and having a throttle valve 16 to control the flow of fuel or the flow of the combustible mixture to control the speed of the engine 10.

The throttle valve 16 is secured to a shaft 18 journalled in the carburetor walls and a lever 20 is secured to the shaft 18 to activate it. The throttle shaft 18 may be activated by a linkage operably connected to any suitable control such as a foot actuated accelerator pedal adapted to be actuated by the driver of the vehicle. The throttle actuating linkage embodies a lost motion connection whereby the throttle valve 16 may be moved toward the closed position illustrated in FIGURE 2 by the lever 20. The lever 20 is movable from a closed throttle position 22 shown in full lines to a full throttle open position 24 shown in dotted lines.

Means responsive to the speed of the vehicle are provided to shift the throttle open position 24 in the throttle closed direction, toward the position 22 to partially close the throttle valve 16 thereby restricting or throttling the flow of fuel or combustible mixture to the engine when the vehicle reached the governed speed.

One illustrative example of engine speed limiting means consists of a governor 26 having bell cranks 28 pivoted at 30 on a rotatable plate 32 and having weights 34 to pivot the bell cranks outwardly in proportion to the speed of the rotatable plate 32. An inwardly directed arm 33 projects into a groove 35 of a movable plate 36 slidably mounted on a shaft 38 having a gear 40 driven by a gear 42 on the transmission shaft 12.

A micro switch 44 mounted in the governor housing 46 has a plunger 48 positioned to be engaged by the movable plate 36. The micro switch 44 is connected by a lead 50 to a solenoid 52 having a plunger 54 adapted to be shifted longitudinally of the casing of the solenoid 52 when the solenoid is energized. The plunger 54 is connected preferably through a vertically movable hinge connection 56 with a slide 58 having a slot 60 adapted to align with another slot in a second slide 62 adapted to align with the slide 58 and having a slot 64 adapted to receive a pin 66 carried by the throttle lever 20. As shown in FIGURE 1 the slot 64 in the slide 62 is of sufficient length to accommodate the movement of the throttle lever 20 as it moves from the throttle closed position 22 shown in full lines to the throttle fully opened position 24 shown in dotted lines in FIGURE 1.

As the vehicle equipped with my improved governor control is accelerated the governor 26 moves the plate 36 outwardly on the shaft 38 as shown in FIGURE 1 as the vehicle accelerates. When a speed corresponding with a desired governor setting has been attained, such for example as a 55 m.p.h. vehicle speed on a level road, the plate 36 engages the plunger 48 of the micro switch 44. An electrical circuit is then completed to the solenoid 52 whereupon the plunger 54 is shifted outwardly relative to the casing of the solenoid 52 to move the slide 62 outwardly to the position shown in dotted lines in FIGURE 2. The left end of the slot 64 then engages the pin 66 and oscillates the lever 20 in the counter-clockwise direction to the position shown in dotted lines in FIGURE 2 thereby reducing the opening of the throttle lever 20 to restrict the flow of fuel or combustible mixture to the carburetor 14. As the fuel supply to the engine is reduced the engine is prevented from accelerating beyond the speed required to drive the vehicle at the pre-established speed, such for example as at the speed of 55 m.p.h. As the vehicle slows down due to the reduction of the fuel or combustible mixture supplied to it the bell cranks 28 having the weights 34 being spring pressed inwardly moves the plate 36 downwardly away from the plunger 48 of the micro switch 44 to de-energize the solenoid 52 whereupon the plunger 54 is retracted by its spring to move the slide 62 away from the throttle obstructing position. The throttle 16 may then be moved in the opening direction toward the position shown in dotted lines in FIGURE 1 to supply more fuel or combustible mixture to accelerate the engine to increase the torque to drive the vehicle. The full torque of the engine is thus available to carry the load to which the engine is subjected. When the preselected vehicle speed has been attained, the governor will again be activated to move the throttle lever 20 in the throttle closing direction to reduce the speed of the engine. My improved governor control functions to control the speed of the engine within quite close limits of vehicle speed. As the speed of the vehicle reaches the speed at which the governor is set to function the plate 36 moves into engagement with the plunger 48 of the micro switch 44 to energize the solenoid 52 to reduce the opening of the throttle valve 16 thereby reducing the charge to the engine and preventing the engine from accelerating further. When the vehicle speed drops by a small amount, possibly one or two miles per hour speed, the plate 36 disengages the plunger 48 of the micro switch 44 to permit the throttle 16 to move in the opening direction to accelerate the engine. This action of periodically reducing the throttle opening and then releasing it is continued to prevent the engine from operating at excessive speeds. My invention is particularly useful when applied to trucks where heavy loads must be carried. It is important that overspeeding of the engine be avoided. It is also important that the engine be capable of operating at sufficient speeds to enable it to deliver its maximum engine rated horsepower when heavy loads are imposed on the engine as for example when the truck or other vehicle is going up a hill. With my improved governor control the engine is permitted to operate at high speed when the load imposed on the engine is so great that the speed of the vehicle remains below the governor speed such for example as 55 m.p.h. Under those conditions the opening of the throttle valve is not reduced, and the engine is permitted to accelerate to sufficient speeds to develop the maximum engine rated horsepower. It will then be apparent that my improved governor control does not operate strictly in accordance with engine speed but permits the engine speed to increase to supply the torque required to carry the load of the vehicle up to the governed speed.

To change the governor setting to vary the vehicle speed at which the position of the throttle will be restricted to prevent the engine from overspeeding a wing nut or other suitable fastener 68 may be loosened to permit the slides 58 and 62 to move relative to each other. When an engine speed corresponding with the desired vehicle speed on a level road has been attained the slide 62 is positioned with the pin 66 carried by the throttle lever 20 at the left hand end of the slot 64 in the slide 62. The wing nut 68 is then tightened to securely clamp together the slides 58 and 62. With that setting the governor mechanism will function to limit the opening movement of the throttle valve as a vehicle speed corresponding with the setting is attained. The engine is thus prevented from operating at speeds in excess of the engine speed required to drive the vehicle at the selected vehicle speeds. The engine is of course permitted to accelerate to above the speed required to drive the vehicle at the governor speed on a level road if the load of the vehicle to which the engine is subjected is such that greater torque is required, as for example as when the vehicle is going up a hill.

I claim:

1. A governor control for a vehicle engine having a driver operated throttle controlling the supply of combustible mixture to the engine and movable from a closed to an open position, control means including a movable lever for reducing the open position of the throttle to reduce the combustible mixture supplied to the engine regardless of the position of the driver operated control, electrically actuated means to move said movable lever to reduce the open position of the throttle, a shaft driven at a speed proportionate to vehicle speed, a governor having a movable element responsive to the speed of said shaft, a governor actuated means for energizing the electrically actuated means to reduce the open position of the throttle, and adjustable slides adapted to be secured together in clamping relation interposed between the electrically actuated means and the movable lever to reduce the open position of the throttle to vary the governed speed.

2. The invention defined in claim 1 wherein the electrically actuated means to reduce the open position of the throttle is a solenoid.

3. The invention defined in claim 2 wherein the governor has a movable member, and a switch is interposed between the movable member and the electrically actuated means to move the movable lever to reduce the open position of the throttle.

4. The invention defined in claim 3 wherein the movable member of the governor is centrifugally actuated, and the switch is of the micro type.

References Cited

UNITED STATES PATENTS

| | | | |
|---|---|---|---|
| 2,077,555 | 4/1937 | Frantz | 180—109 |
| 2,201,629 | 5/1940 | McCullough | 180—110 |
| 2,829,215 | 4/1958 | Middleton | 200—80 |
| 2,832,864 | 4/1958 | Rapp | 200—80 |
| 2,839,949 | 6/1958 | Buell et al. | 74—513 |
| 3,077,239 | 2/1963 | Simas | 123—102 |
| 3,114,428 | 12/1963 | Jacobson | 180—110 |

KENNETH H. BETTS, Primary Examiner

U.S. Cl. X.R.

123—102; 74—586